United States Patent [19]

Hilliard

[11] 3,898,300

[45] Aug. 5, 1975

[54] EMULSION POLYMERIZATION METHOD TO PRODUCE A POLYMERIC STYRENE-ACRYLONITRILE-POLYORGANOSILOXANE COMPOSITION AND PRODUCT

[75] Inventor: John R. Hilliard, Midland, Mich.

[73] Assignee: Dow Corning Corporation, Midland, Mich.

[22] Filed: Jan. 31, 1974

[21] Appl. No.: 438,480

[52] U.S. Cl. ...... 260/827; 260/29.6 RB; 260/80.81; 260/85.5; 260/88.1 PN; 260/874
[51] Int. Cl. ... C08f 33/02; C08f 33/08; C08f 35/02
[58] Field of Search..... 260/827, 29.6 RB, 29.6 NR, 260/88.1, 93.5 W, 85.5

[56] References Cited
UNITED STATES PATENTS

| | | | |
|---|---|---|---|
| 3,547,857 | 12/1970 | Murray | 260/93.5 W |
| 3,575,910 | 4/1971 | Thomas | 260/29.6 NR |
| 3,657,164 | 4/1972 | Jastrow et al. | 260/827 |
| 3,691,260 | 9/1972 | Mittnacht et al. | 260/29.6 RB |

Primary Examiner—Wilbert J. Briggs, Sr.
Attorney, Agent, or Firm—Roger H. Borrousch

[57] ABSTRACT

Adding styrene and acrylonitrile and/or methylmethacrylate to an aqueous emulsifier system comprising a redox polymerization catalyst and an emulsified polyorganosiloxane having a molecular weight of at least 10,000 and an average particle size of 1000 to 10,000 Angstroms, continuing the polymerization until substantially all the monomers have polymerized, coagulating a styrenic copolymer compositiion, separating the styrenic copolymer composition from the aqueous medium and recovering the styrenic copolymer composition provides a composition consisting of a continuous styrenic copolymer matrix having dispersed therein gelled particles which are essentially free of inclusions of free styrenic copolymer, and present in an amount sufficient to provide a polyorganosiloxane gel ratio of at least 0.65. The composition is a thermoplastic which has a notched Izod impact strength of greater than 1.0 foot pound per inch of notch, which has improved lubricity and weatherability.

26 Claims, No Drawings

EMULSION POLYMERIZATION METHOD TO PRODUCE A POLYMERIC STYRENE-ACRYLONITRILE-POLYORGANOSILOXANE COMPOSITION AND PRODUCT

BACKGROUND OF THE INVENTION

1. Field of the Invention

This invention relates to an emulsion polymerization method for styrene-acrylonitrile and/or methylmethacrylate in the presence of polyorganosiloxane and to a toughened styrenic copolymer composition.

2. Description of the Prior Art

The emulsion polymerization of styrene and styrene copolymers has been well known for many years. Such styrene copolymers as acrylonitrile-butadiene-styrene (ABS) copolymers have been known and are commercially produced by emulsion methods. The patent literature has been comprehensively described by C. Placek in "ABS Resin Manufacture". Chemical Process Review, No. 46, 1970, Noyes Data Corporation, Park Ridge, N.J. Placek discusses one patent relating to silicone materials, U.S. Pat. No. 3,046,239, W. C. Calvert. Calvert blends various silicones with high impact graft copolymers to make higher impact blends which also have improved aging when exposed to the weather. Calvert teaches that the high impact graft copolymer when blended with any type of silicone has improved impact. Thus, according to Calvert, there is no difference in using thin fluid silicones or silicone gums because the same impact improvement is obtained. However, this comprehensive review of patent literature by Placek does not describe any method of polymerizing styrenic copolymers in the presence of silicones. As will be shown herein, all silicones do not provide the same products where the silicone is present during the polymerization of a styrenic copolymer.

As shown by British Patent Specification No. 1,161,072, it is known to polymerize olefinically unsaturated organic monomer in the presence of an aqueous emulsion of a polysiloxane containing a substituent containing an ethylenic double bond. This patent specification as other prior art references are directed to the preparation of copolymers wherein the silicone becomes a part of the copolymer. Such references do not suggest how to make a toughened thermoplastic by an aqueous emulsion method. This British specification teaches by illustration in the examples that potassium persulfate, hydrogen peroxide, azobisisobutyronitrile, benzoyl peroxide, tertiary butyl hydroperoxide and ammonium persulfate are used as polymerization catalyst and illustrates numerous other peroxides as equivalents. However, it has been found that although these catalysts polymerize olefinic organic monomers in an emulsion containing a polysiloxane, they do not provide a toughened thermoplastic. As will be detailed below, the present invention provides a toughened styrenic copolymer when a redox polymerization catalyst is used. Redox is another name for reduction activation. It was entirely unexpected that a redox polymerization catalyst would provide a toughened styrenic copolymer whereas a conventional emulsion polymerization catalyst such as potassium persulfate, per se, would not.

SUMMARY OF THE INVENTION

An object of this invention is to provide a method for the preparation of a polyorganosiloxane toughened styrenic copolymer containing styrene and a nitrile and/or methylmethacrylate and to provide a polyorganosiloxane toughened styrenic copolymer.

This invention relates to a method for the emulsion polymerization of a styrenic copolymer containing styrene and a nitrile and/or methylmethacrylate where the monomeric compounds are polymerized in the presence of an emulsified polyorganosiloxane having 0.5 to 8 percent vinyl or allyl groups using a redox polymerization catalyst. The resulting product is a toughened styrenic copolymer composition having a notched Izod impact strength of at least 1.0 foot pounds per inch of notch.

DESCRIPTION OF THE INVENTION

This invention relates to a method for the emulsion polymerization of styrenic copolymers comprising adding a monomeric composition to an aqueous emulsifier system at a suitable temperature for polymerization of the monomeric composition, said emulsifier system consisting essentially of a redox polymerization catalyst for the monomeric composition and an emulsified polyorganosiloxane, continuing the polymerization until substantially all the monomeric composition is polymerized to a styrenic copolymer composition, coagulating the styrenic copolymer composition, separating the styrenic copolymer composition from the aqueous medium and recovering the styrenic copolymer composition, said monomeric composition consisting essentially of 10 to 95 weight percent of a styrene selected from styrene, alpha-methylstyrene and ring substituted chlorinated styrene, 0 to 60 weight percent of a nitrile selected from the group consisting of acrylonitrile and methacrylonitrile and 0 to 70 weight percent methylmethacrylate, there being at least one styrene monomer and at least one monomer from the nitrile group or methylmethacrylate or at least one styrene monomer, methylmethacrylate and at least one monomer from the nitrile group, said emulsified polyorganosiloxane having units of the formulae $R_2SiO$, $RSiO_{1.5}$, $R_3SiO_{0.5}$ and $SiO_2$ wherein there is for each 100 moles of $R_2SiO$ units, from 0 to 12 moles of $RSiO_{1.5}$ units, from 0 to 1.5 moles of $R_3SiO_{0.5}$ units and from 0 to 5 moles of $SiO_2$ units, where R is a monovalent radical selected from the group consisting of methyl, phenyl, vinyl and allyl where at least 60 percent of the R groups of the polyorganosiloxane are methyl and from 0.5 to 8 percent of the R groups are vinyl or allyl, said polyorganosiloxane having a molecular weight of at least 10,000 and the polyorganosiloxane molecule being endblocked with groups selected from $R_3SiO_{0.5}$ units, hydroxyl groups or both, the emulsified polyorganosiloxane having an average particle size of from 1000 to 10,000 Angstroms where at least 50 percent of the particles fall within said range of particle size, and the amount of polyorganosiloxane being from 5 to 70 weight percent based on the combined weight of the monomeric composition and the polyorganosiloxane where the monomeric composition and the polyorganosiloxane are 100 weight percent.

The emulsion polymerization method of this invention comprises adding a monomeric composition to an aqueous emulsifier system. For the purposes of this invention, an aqueous emulsifier system is a water medium containing all the necessary ingredients to emulsify the components of the method and includes a redox polymerization catalyst for the monomeric composition and an emulsified polyorganosiloxane. This includes any emulsifiers, dispersants and surfactants which are conventionally used in emulsifying polyorganosiloxanes, the monomeric compounds and the styrenic copolymers in aqueous systems. Emulsified polyorganosiloxanes are known in the art, such as found in U.S. Pat. Nos. 2,891,920; 3,294,725 and 3,360,491 which are hereby incorporated by reference to show the preparation of emulsified polyorganosiloxanes and to provide examples of emulsified polyorganosiloxanes. The aqueous emulsifier system does not usually require any additional emulsifying agents other than those present in the emulsified polyorganosiloxane. However, the present method does not preclude the use of additional emulsifying agents. The redox polymerization catalysts for the monomeric composition of the present method are those redox polymerization catalysts conventionally used in the polymerization of the monomeric composition which include the styrenes, the nitriles and methylmethacrylate of this invention. Such redox polymerization catalysts comprise a free radical generating compound, a reducing agent and a catalyst promoter. The free radical generating compounds include peroxides such as cumene hydroperoxide, azo compounds such as 2-azobis(isobutyronitrile) and potassium persulfate to name some among other equally useful well known free radical generating compounds. The reducing agent can be a variety of reducing agents including reducing sugars such as dextrose. The catalyst promoter can be a metal ion having more than one oxidation state including metals such as iron, copper, cobalt, manganese, lead and selenium. These catalyst promoters are added as soluble salts such as ferrous sulfate and the like.

The monomeric composition is added to the aqueous emulsifier system which is at a suitable temperature. The temperature of the emulsifier system can vary from below room temperature to about the boiling point of the aqueous emulsifier system. One limitation of this aqueous emulsifier system is the stability of the emulsion. Temperatures which break the emulsion should not be used. Temperatures suitable for polymerization of the monomeric composition depend upon the particular redox polymerization catalyst and the particular combination of ingredients of the monomeric composition. For many combinations of redox polymerization catalysts and monomeric compositions, the preferred temperature is from 50° to 75°C. The rate of addition of the monomeric composition to the aqueous emulsifier system can vary widely, but the best results are obtained if the addition is slow, such as by dripping or gradually fed into the emulsifier system. However, suitable materials can be obtained wherein the monomeric composition is added at one time. The emulsions during the polymerization preferably have a solids content of less than 50 weight percent. The lower limit is usually determined by suitable production efficiency.

After the monomeric composition has been added to the aqueous emulsifier system, the polymerization continues until substantially all the monomeric composition is polymerized to a styrenic copolymer. The polymerization temperature is maintained during this period and the polymerizing mixture is preferably stirred or agitated during this period. The time to substantially polymerize the monomeric composition can vary depending upon the ingredients and temperature, but can readily be followed by observing the amount of unreacted species of the monomeric composition. By the term "substantially" it is meant that for all practical purposes, the polymerization is complete. A few percent of unreacted monomeric species, is not detrimental to this method, as long as the polymerization is at least about 90 percent complete. The yield will increase with a more complete polymerization and thus less than one percent unreacted monomeric species is usually desired. The amount of unreacted monomeric species can readily be followed by conventional analytical analysis, such as gel phase chromatography.

After the polymerization is completed, the resulting styrenic copolymer composition in the emulsion is coagulated by using conventional coagulating means such as adding a salt to the emulsion, for example calcium chloride. The coagulated styrenic copolymer composition is then separated from the aqueous phase such as by decanting and filtering and then washing and drying. Thereafter, a styrenic copolymer composition is obtained which has improved properties such as increased impact strength and weatherability.

The monomeric composition of this invention is a mixture of at least two vinylic monomeric species wherein at least one species is a styrene. The styrenes can be styrene, alpha-methylstyrene, ring substituted chlorinated styrenes or mixtures thereof. Ring substituted chlorinated styrenes include, for example monochlorostyrene, dichlorostyrene, trichlorostyrene, tetrachlorostyrene, monochloro-alpha-methylstyrene, dichloro-alpha-methylstyrene, and the like. The monomeric composition is made up of at least one styrene monomer and one monomer from acrylonitrile, methacrylonitrile or both, or methylmethacrylate; or at least one styrene monomer and methylmethacrylate and at least one of acrylonitrile and methacrylonitrile. The styrenes are present in the monomeric composition in amounts of from 10 to 95 weight percent, the nitriles are present in amounts of from 0 to 60 weight percent and methylmethacrylate is present in amounts of from 0 to 70 weight percent, wherein the total weight of the styrenes, the nitriles and methylmethacrylate are 100 weight percent of the monomeric composition. Some preferred monomeric compositions are those having from 65 to 75 weight percent styrene and 25 to 35 weight percent acrylonitrile.

The emulsified polyorganosiloxane can be prepared as described in the patents cited above and for this invention is essentially a polydiorganosiloxane which can have varying amounts of other siloxane units. Thus, the polyorganosiloxane can have for each 100 moles of $R_2SiO$ units, from 0 to 12 moles of $RSiO_{1.5}$ units, from 0 to 1.5 moles of $R_3SiO_{0.5}$ units and from 0 to 5 moles of $SiO_2$ units. Preferably, the polyorganosiloxane contains from 0.5 to 2 moles of $SiO_2$ units or from 0.75 to 3 moles of $RSiO_{1.5}$ units per 100 moles of $R_2SiO$ units which provide branching in the polyorganosiloxane. This amount of $RSiO_{1.5}$ and $SiO_2$ units improve the strength of the final styrenic copolymer composition. The R represents monovalent radicals selected from methyl, phenyl, vinyl and allyl. In the polyorganosiloxane at least 60 percent of the R groups are methyl and from 0.5 to 8 percent of the R groups are vinyl or allyl. The polyorganosiloxane, preferably, has from 2 to 8 percent of the R groups as vinyl or allyl, preferably vinyl. The polyorganosiloxanes can also have small amounts of other monovalent radicals, not listed above, as long as they are not detrimental to the polymerization process. Some monovalent radicals may even be helpful to the polymerization, such as mercaptoalkyl radicals. By the term small amounts it is understood that one or two percent or less are small amounts.

The vinyl or allyl content of the polyorganosiloxane is important to the characteristics of the styrenic copolymer compositions obtained by this invention. The above range of vinyl or allyl are required to provide the proper amount of grafting of the monomers of the monomeric composition to the polyorganosiloxane and to provide the proper crosslinking for the gelled particles in the styrenic copolymer. The impact strength of the styrenic copolymer compositions will not exceed 1.0 foot pound per inch of notch (notched Izod), if the vinyl or allyl content of the polyorganosiloxane is not at least 0.5 percent of the R groups. If the vinyl or allyl content exceeds about 8 percent of the R groups, the preparation of the styrenic copolymer compositions becomes uneconomical. The endblocking units for polyorganosiloxane can be $R_3SiO_{0.5}$ or hydroxyl groups or both.

The molecular weight of the polyorganosiloxane is also important to obtaining suitable impact strength in the styrenic copolymer composition. A weight average molecular weight of at least 10,000 is required to provide an impact strength of at least 1.0 foot pound per inch of notch, preferably a molecular weight of at least 250,000 is desirable for best total properties. The upper limit of the molecular weight is determined by the ability to make an emulsified polyorganosiloxane wherein the average particle size is from 1000 to 10,000 Angstroms and at least 50 percent of the particles fall within this particle size range. Preferably the emulsified polyorganosiloxane has an average particle size of from 1000 to 4000 Angstroms. It should be understood that the emulsified polyorganosiloxane is a stable emulsion which is stable during the method herein described.

The amount of polyorganosiloxane can be from 5 to 70 weight percent based on the combined weight of the monomeric composition and the polyorganosiloxane wherein these are 100 weight percent. Preferably, the polyorganosiloxane is present in an amount of from 5 to 30 weight percent wherein a styrenic copolymer composition has a room temperature notched Izod impact strength of greater than 1.0 foot pound per inch of notch wherein the notch is 45° and 0.1 inch deep for a compression molded sample. Styrenic copolymer compositions having from 30 to 70 weight percent polyorganosiloxane are particularly useful for blending with copolymeric material such as styrene-acrylonitrile copolymers.

In the method of this invention the emulsifier system can also include a buffer, such as sodium pyrophosphate, and a chain transfer agent, such as n-dodecylmercaptan. Other buffers and chain transfer agents are known in the art of redox polymerization, but for the purposes of this invention the buffers and chain transfer agents should be selected for use in an aqueous emulsion system and also should not be detrimental to the stability of the polyorganosiloxane.

The recovered styrenic copolymer composition is a continuous styrenic copolymer matrix having copolymer units derived from those monomers of the monomeric composition. This continuous matrix contains dispersed gelled particles which are essentially free of inclusions of free styrenic copolymer, have an average particle size of from 1000 to 10,000 Angstroms with at least 50 percent of the particles falling within this range, and are made up of polyorganosiloxane and styrenic copolymer grafted to the polyorganosiloxane. By the phrase "essentially free of inclusions of free styrenic copolymer", it is to be understood that there may be some very small amounts of free styrenic copolymer in the gelled particles but such amounts are for all practical purposes undetectable.

The gelled particles are present in the styrenic copolymer composition in sufficient amounts to provide a polyorganosiloxane gel ratio of at least 0.65. This polyorganosiloxane gel ratio is determined by using a 0.6 ± 0.1 gram sample of composition, adding 35 milliliters of acetone, and agitating the sample in a closed container for about 16 hours (at least overnight) then centrifuging the sample for 30 minutes at 3000 rpm, decanting the solution from the gel, drying the gel for 2 hours under vacuum at 100°C., and then determining the weight of the gel. The percent of total gel is the weight of the gel divided by the original weight of the composition multiplied by 100. The percent of polyorganosiloxane in the original composition can be determined by silicon analysis. The polyorganosiloxane gel ratio is then determined by dividing the total percent gel by the percent polyorganosiloxane in the composition. This polyorganosiloxane gel ratio should be at least 0.65 to obtain an impact strength of at least 1.0 foot pound per inch of notch and is preferably at least 0.70.

When the styrenic copolymer compositions of this invention have the combination of features described above, such as polyorganosiloxane gel ratio, particle size of gelled particles, polyorganosiloxane as defined and the like, the room temperature notched Izod impact strength is greater than 1.0 foot pound per inch of notch wherein the notch is 45° and 0.1 inch deep for a compression molded sample. Compared to ABS (acrylonitrile-styrene-butadiene copolymer) the styrenic copolymer compositions of this invention have improved extreme temperature performance such as it does not yellow like ABS when exposed to high temperature and retains its impact strength at low temperatures such as to −40°C. These compositions also have improved weathering characteristics which permits increased use in outside applications. Also the surface lubricity is superior to ABS, particularly as observed using the reciprocating ball bearing wear tester. In other properties, such as tensiles, impact strength, moduli, elongation, hardness and flexural strength, the styrenic copolymer compositions of this invention can be considered comparable to ABS. Thus, with the improved temperature properties, lubricity and weatherability, the styrenic copolymer compositions of this invention, find use in applications wherein ABS is used, but, in addition, can be used where lower temperatures prevents the use of ABS, in applications where atmospheric exposure would normally exclude the use of ABS, and in applications where a lower coefficient of friction is required or desired. The styrenic copolymer compositions are thermoplastic in nature and thus, can be formed into articles with the methods used for thermoplastics, such as molding and extruding.

The styrenic copolymer compositions of this invention can be used as prepared, however the compositions which are most useful for direct use in making articles and the like are those which contain from 5 to 30 weight percent polyorganosiloxane. The styrenic copolymer compositions which contain from 30 to 70 weight percent polyorganosiloxane are particular useful for masterbatching wherein these compositions are mixed with copolymers derived from the monomeric composition but containing no polyorganosiloxane, to provide final compositions having from 5 to 30 weight percent polyorganosiloxane. The two concentration ranges of polyorganosiloxane discussed above should not be construed as specific for two totally separate use categories. These styrenic copolmer copoositions can be used over the entire range for each category, however, the ranges of polyorganosiloxane makes them particularly useful for masterbatching or in use applications per se without masterbatching. The masterbatchs can readily be made by mechanical blending of the styrenic copolymer compositions with the copolymers such as those of styrene and acrylonitrile. Although masterbatching can be used, the best results in properties are found with those having no blending.

The following examples are presented for illustrative purposes only and should not be construed as limiting the present invention which is properly delineated in the claims.

EXAMPLE 1

An emulsified polyorganosiloxane was prepared by dissolving 20 grams of dodecylbenzenesulfonic acid in 1200 grams of water and then adding to this aqueous solution, a mixture of 620 grams of mixed polydimethylsiloxane cyclics and 180 grams of mixed polymethylvinylsiloxane cyclics. The resulting mixture was then shaken and immediately given three passes through a homogenizer at 4500 p.s.i. The emulsion formed was then placed in a three-neck flask and heated at 90°C. for 3 hours with vigorous stirring. During this three hour period, an additional 25 grams of dodecylbenzenesulfonic acid was dripped into the emulsion. The emulsion was allowed to cool to room temperature and then placed in a refrigerator at 0°C. for 100 hours. The resulting emulsion was then neutralized to a pH of 7.5 at room temperature. The resulting emulsified polydiorganosiloxane had about 90 percent methyl radicals and 10 percent vinyl radicals with polydiorganosiloxane molecular weight of greater than 10,000. The emulsified polydiorganosiloxane was about 30 percent solids.

In a 500 ml. three-neck flask equipped with a stirrer, condenser, thermometer and a nitrogen inlet, 214 grams of the above emulsified polydiorganosiloxane was added. To this emulsion 11 grams of water, 0.750 grams of sodium pyrophosphate decahydrate, 1.5 grams of dextrose, 0.975 grams of cumene hydroperoxide, 0.1 grams of n-dodecylmercaptan and 0.1 grams of ferrous sulfate heptahydrate were added. The emulsion was then heated to 65°C. and over a three hour period, a mixture of 50 grams of styrene and 25 grams of acrylonitrile was dripped into the emulsion. The resulting emulsion was continually stirred and held at 65°C. for an additional 5.5 hours at which time the styrene and acylonitrile were more than 90 percent polymerized. The styrenic copolymer composition was then coagulated by adding calcium chloride to the emulsion, filtering, washing with water and then drying in a hot air oven.

A styrenic copolymer composition was prepared as described above except the sodium pyrophosphate decahydrate, dextrose and ferrous sulfate heptahydrate were left out. This styrenic copolymer composition was prepared by a non-redox polymerization catalyst for comparative purposes.

Mixtures of the resulting styrenic copolymer compositions and a commercial styrene-acrylonitrile copolymer were prepared by placing the ingredients in a CAM head of a Brabender Plasticorder and mixing for 6 minutes at 63 rpm at 180°C. The mixtures were then compression molded at 173°C. and 4500 p.s.i. for 3 minutes for determination of the notched Izod impact strength which was carried out according to the procedure of ASTM-D256-56T using the following test conditions a 45° notch, 0.1 inch deep and room temperature. The weight percent polydiorganosiloxane in the composition was determined by silicon analysis and the results were as shown in Table I. The notched impact strengths were as shown in Table I for the mixtures and the comparative sample. In the following tables, "Impact Strength" will mean Notched Izod Impact Strength with units in foot pounds per inch of notch; "SCC" will mean styrenic copolymer composition; "SAN" will mean a commercial styrene-acrylonitrile copolymer; "% Siloxane in Mixture" will mean weight percent polyorganosiloxane in blend of SAN and SCC; "% Siloxane in SCC" will mean weight percent polyorganosiloxane in SCC; "Emulsified Siloxane" will mean emulsified polyorganosiloxane; "% Vinyl Radicals" will mean the precentage of vinyl radicals based on the total number of organic radicals bonded to the polyorganosiloxane and "$M_w$" will mean weight average molecular weight.

TABLE I

| Weight % SAN* | Weight % SCC | % Siloxane in Mixture | Impact Strength |
|---|---|---|---|
| 100 | 0 | 0 | 0.4 |
| 80 | 20* | (~10) | 0.4 |
| 80 | 20 | 9.9 | 1.3 |
| 60 | 40 | 19.9 | 2.2 |

*This styrenic copolymer composition was prepared by a non-redox polymerization catalyst.

EXAMPLE 2

A. An emulsified polyorganosiloxane was prepared by dissolving 20 grams of dodecylbenzenesulfonic acid in 1200 grams of water and then adding to this aqueous solution, a mixture of 777 grams of mixed polydimethylsiloxane cyclics and 23 grams of polymethylvinylsiloxane cyclics. The resulting mixture was then shaken and immediately given three passes through a homogenizer at 4500 p.s.i. The emulsion formed was then placed in a three-neck flask and heated at 90°C. for 3 hours with vigorous stirring. During this three hour period, an additional 20 grams of dodecylbenzenesulfonic acid was dripped into the emulsion. The emulsion was allowed to cool to room temperature and then placed in a refrigerator at 0°C. for 192 hours. The resulting emulsion was then neutralized to a pH of 7.5 at room temperature. The resulting emulsified polydiorganosiloxane had 98.8 percent methyl radicals and 1.2 percent vinyl radicals with a weight average molecular weight of 440,000. The emulsified polydiorganosiloxane was about 31 weight percent solids.

B. An emulsified polyorganosiloxane was prepared as described in A. above, except 754 grams of mixed polydimethylsiloxane cyclics and 46 grams of mixed polymethylvinylsiloxane cyclics were used. The resulting emulsified polydiorganosiloxane had 97.5 percent methyl radicals and 2.5 percent vinyl radicals with a weight average molecular weight of 485,000.

C. An emulsified polyorganosiloxane was prepared as described in A. above except 708.5 grams of mixed polydimethylsiloxane cyclics and 91.5 grams of mixed polymethylvinylsiloxane cyclics were used. The resulting emulsified polydiorganosiloxane had 95 percent methyl radicals and 5 percent vinyl radicals with a weight average molecular weight of 425,000.

D. An emulsified polyorganosiloxane was prepared as described in A. above, except 620 grams of mixed polydimethylsiloxane cyclics and 180 grams of mixed polymethylvinylsiloxane cyclics were used. The resulting emulsified polydiorganosiloxane had 90 percent methyl radicals and 10 percent vinyl radicals with a weight average molecular weight of 465,000.

E. An emulsified polyorganosiloxane was prepared by dissolving 60 grams of dodecylbenzenesulfonic acid in 2000 grams of water and then adding to this aqueous solution, a mixture of 1193 grams of mixed polydimethylsiloxane cyclics and 25.3 grams of tetraethoxysilane. The resulting mixture was then shaken and immediately given three passes through a homogenizer at 4500 p.s.i. The emulsion formed was then placed in a three-neck flask and heated at 90°C. for 3 hours with vigorous stirring. The emulsion was allowed to cool to 23°C. and then stand for 20 hours. The resulting emulsion was then neutralized to a pH of 7.5. The resulting emulsified polydiorganosiloxane had 100 percent methyl radicals and had 0.76 moles of $SiO_2$ per 100 moles of $(CH_3)_2SiO$.

F. Each of the above emulsified polyorganosiloxanes were used in preparing styrenic copolymer compositions. To 148 grams of each emulsified polyorganosiloxanes, 517 grams of water, 1.3 grams of sodium pyrophosphate decahydrate, 2.6 grams of dextrose, 1.7 grams of cumene hydroperoxide, 0.3 gram of n-dodecylmercaptan and 0.24 gram of ferrous sulfate heptahydrate were added. The emulsion was then heated to 65°C. and over a 3 hour period, a mixture of 135 grams of styrene and 75 grams of acrylonitrile was dripped into the emulsion. The resulting emulsion was continually stirred and held at 65°C. for an additional 5.5 hours at which time the styrene and acrylonitrile were more than 95 percent polymerized. The styrenic copolymer composition was then coagulated by adding a 2 percent calcium chloride solution to the emulsion, filtering, washing with water and then drying in a hot air oven.

The notched Izod impact strength was determined by the procedure described in Example 1 on each styrenic copolymer composition and the results were as shown in Table II. The percent of polyorganosiloxane in the styrenic copolymer composition was determined by silicon analysis and the percent of silicon used to calculate the percent of polyorganosiloxane in the styrenic copolymer composition.

TABLE II

| Emulsified Siloxane | % Vinyl Radicals | % Siloxane in SCC | Impact Strength |
|---|---|---|---|
| E. | 0.0 | 21 | 0.5 |
| A. | 1.2 | 13 | 2.2 |
| B. | 2.5 | 15 | 4.4 |
| C. | 5.0 | 16 | 3.3 |
| D. | 10.0 | 14 | 3.0 |

EXAMPLE 3

A. A styrenic copolymer composition was prepared by adding to 66 grams of the emulsified polyorganosiloxane of Example 2(C), 501 grams of water, 1.5 grams of sodium pyrophosphate decahydrate, 3.0 grams of dextrose, 1.95 grams of cumene hydroperoxide, 0.3 gram of n-dodecylmercaptan, and 0.27 gram of ferrous sulfate heptahydrate. The emulsion was then polymerized and recovered as described in Example 2(F).

B. The styrenic copolymer composition of Example 2, using emulsified polyorganosiloxane C.

C. A styrenic copolymer composition was prepared as described in A. above, except 253 grams of the emulsified polyorganosiloxane of Example 2(C) and 540 grams of water were used.

D. A styrenic copolymer composition was prepared by adding to 211 grams of the emulsified polyorganosiloxane of Example 2(C), 14 grams of water, 0.75 gram of sodium pyrophosphate decahydrate, 1.5 grams of dextrose, 0.975 gram of cumene hydroperoxide, 0.1 gram of n-dodecylmercaptan and 0.1 gram of ferrous sulfate heptahydrate. The emulsion was then polymerized and recovered as described in Example 2(F).

The notched Izod impact strength was determined by the procedure described in Example 1 on each styrenic copolymer composition and the results were as shown in Table III.

TABLE III

| SCC | % Siloxane in SCC | Impact Strength |
|---|---|---|
| A. | 8 | 2.0 |
| B. | 16 | 3.3 |
| C. | 26 | 7.0 |
| D. | 49 | 2.1 |

EXAMPLE 4

Emulsified polyorganosiloxanes were prepared as described in Example 2(E) except the amounts and ingredients were as defined below.

A. 1124 grams of mixed polydimethylsiloxane cyclics.
   71 grams of mixed polymethylvinylsiloxane cyclics and
   11 grams of methyltrimethoxysilane.
B. 1119 grams of mixed polydimethylsiloxane cyclics,
   71 grams of mixed polymethylvinylsiloxane cyclics and
   22 grams of methyltrimethoxysilane.
C. 1108 grams of mixed polydimethylsiloxane cyclics,
   71 grams of mixed polymethylvinylsiloxane cyclics and
   44 grams of methyltrimethoxysilane.
D. 1086 grams of mixed polydimethylsiloxane cyclics,
   71 grams of mixed polymethylvinylsiloxane cyclics and -Continued

| | | |
|---|---|---|
| | 88 | grams of methyltrimethoxysilane. |
| E. | 1042 | grams of mixed polydimethylsiloxane cyclics, |
| | 71 | grams of mixed polymethylvinylsiloxane cyclics and |
| | 176 | grams of methyltrimethoxysilane. |
| F. | 1122 | grams of mixed polydimethylsiloxane cyclics, |
| | 71 | grams of mixed polymethylvinylsiloxane cyclics and |
| | 25 | grams of tetraethoxysilane. |
| G. | 1111 | grams of mixed polydimethylsiloxane cyclics, |
| | 69 | grams of mixed polymethylvinylsiloxane cyclics and |
| | 67 | grams of tetraethoxysilane. |

Each of the above emulsified polyorganosiloxanes were used in preparing styrenic copolymer compositions. The styrenic copolymer compositions were prepared as described in Example 2(F) except 169 grams of emulsified polyorganosiloxane for A., B., F. and G. and 164 grams of emulsified polyorganosiloxane for C., D. and E., 510 grams of water and 0.3 gram of ferrous sulfate heptahydrate.

The notched Izod impact strength was determined on each styrenic copolymer composition by the procedure described in Example 1. The percent of polyorganosiloxane in the styrenic copolymer composition was determined by silicon analysis and the percent of silicon used to calculate the percent of polyorganosiloxane in the styrenic copolymer composition.

TABLE IV

| Emulsified Siloxane | % Vinyl Radicals | Moles of $CH_3SiO_{3/2}$ units per 100 moles $R_2SiO$ Units | Moles of $SiO_2$ units per 100 moles $R_2SiO$ Units | % Siloxane in SCC | Impact Strength |
|---|---|---|---|---|---|
| A. | 2.57 | 0.51 | — | 19 | 3.5 |
| B. | 2.58 | 1.02 | — | 22 | 3.5 |
| C. | 2.59 | 2.05 | — | 19 | 4.1 |
| D. | 2.60 | 4.16 | — | 19 | 4.8 |
| E. | 2.66 | 8.69 | — | 17 | 4.4 |
| F. | 2.57 | — | 0.75 | 19 | 5.8 |
| G. | 2.55 | — | 2.05 | 19 | 3.9 |

EXAMPLE 5

A. An emulsified polyorganosiloxane was prepared by dissolving 36 grams of dodecylbenzenesulfonic acid in 1800 grams of water and then adding to this aqueous solution a mixture of 1129.3 grams of mixed polydimethylsiloxane cyclics and 70.7 grams of mixed polymethylvinylsiloxane cyclics. The resulting mixture was then shaken and immediately given three passes through a homogenizer at 4500 p.s.i. The emulsion formed was then placed in a three-neck flask and heated at 90°C. for 3 hours with vigorous stirring. A 250 gram portion of this emulsion was mixed with 5 grams of a 2.5 centistoke trimethylsiloxy endblocked polydimethylsiloxane fluid and then heated at 90°C. for 65 hours, and neutralized to a pH of about 8 with at least 2 weight percent sodium hydroxide aqueous solution. The resulting emulsified polydiorganosiloxane had 97.7 percent methyl radicals and 2.3 percent vinyl radicals with a weight average molecular weight of 9,700. The emulsified polydiorganosiloxane was about 30 weight percent solids.

B. An emulsified polyorganosiloxane was prepared as described in (A) above, except that after the heating for 3 hours at 90°C. it was held at 90°C. for an additional three hours and neutralized to a pH of about 7.5 The resulting emulsified polydiorganosiloxane had 97.4 percent methyl radicals and 2.6 percent vinyl radicals with a weight average molecular weight of 44,600. The emulsified polydiorganosiloxane was 30 weight percent solids.

C. An emulsified polyorganosiloxane was prepared as described in (A) above, except that after the heating for 3 hours at 90°C., it was cooled to 75°C. and held at this temperature for 3 hours, and neutralized to a pH of about 7.5. The resulting emulsified polydiorganosiloxane had 97.4 percent methyl radicals and 2.6 percent vinyl radicals with a weight average molecular weight of 64,200. The emulsified polydiorganosiloxane was 30 weight percent solids.

D. An emulsified polyorganosiloxane was prepared as described in (A) above, except that after the heating for 3 hours at 90°C., it was cooled to 50°C. and held at this temperature for 3 hours, and neutralized to a pH of about 7.5. The resulting emulsified polydiorganosiloxane had 97.4 percent methyl radicals and 2.6 percent vinyl radicals with a weight average molecular weight of 126,000. The emulsified polydiorganosiloxane was 30 weight percent solids.

E. An emulsified polyorganosiloxane was prepared as described in (A) above, except that after the heating for 3 hours at 90°C., it was cooled to 23°C. and held at this temperature for 20 hours and then neutralized to a pH of about 7.5. The resulting emulsified polydiorganosiloxane had 97.4 percent methyl radicals and 2.6 percent vinyl radicals with a weight average molecular weight of 251,000. The emulsified polydiorganosiloxane was 30 weight percent solids.

F. The emulsified polydiorganosiloxane of Example 2,(B).

G. Styrenic copolymer compositions were prepared using each of the above emulsified polydiorganosiloxanes by the procedure described in Example 4. The notched Izod impact strength and weight percent polydiorganosiloxane was determined as described in Example 4 and were as shown in Table V.

TABLE V

| Emulsified Siloxane | $M_w$ | % Siloxane in SCC | Impact Strength |
|---|---|---|---|
| A. | 9,700 | 14.7 | 0.3 |
| B. | 44,600 | — | 3.3 |
| C. | 64,200 | 23.4 | 2.0 |
| D. | 126,000 | 19.7 | 2.7 |
| E. | 251,000 | — | 3.8 |
| F. | 485,000 | 15.1 | 4.4 |

EXAMPLE 6

A. A styrenic copolymer composition was prepared as described in Example 2,(F) using the emulsified polydiorganosiloxane of Example 2,(B), except 75 grams of methylmethacrylate was substituted for the acrylonitrile.

B. A styrenic copolymer composition was prepared as described in Example 4 using the emulsified polydiorganosiloxane of Example 4,(F), except one half of the styrene was replaced by alpha-methylstyrene.

C. A styrenic composition was prepared as described in Example 2,(F) where the ingredients were 47 grams of the emulsified polydiorganosiloxane of Example 2,(B), 359 grams of water, 1.0 gram of sodium pyrophosphate decahydrate, 2.0 grams of dextrose, 1.3 grams of cumene hydroperoxide, 0.2 gram of n-dodecylmercaptan, 0.133 gram of ferrous sulfate heptahydrate and 150 grams of styrene. This styrenic composition was prepared for comparative purposes.

D. A styrenic copolymer composition was prepared as described in Example 2,(F), except the ingredients were 169 grams of the emulsified polydiorganosiloxane of Example 4,(F), 510 grams of water, 1.3 grams of sodium pyrophosphate decahydrate, 2.6 grams of dextrose, 1.7 grams of potassium persulfate and 0.3 gram of ferrous sulfate heptahydrate.

The notched Izod impact strengths and the weight percent of polydiorganosiloxane in the styrenic compositions were determined as previously described and were as shown in Table VI.

EXAMPLE 7

The polyorganosiloxane gel ratio was determined for a number of styrenic copolymer compositions and were as shown in Table VII. The polyorganosiloxane gel ratio was determined by weighing a $0.6 \pm 0.1$ gram sample of a styrenic copolymer composition, in a one ounce vial to the nearest 0.001 gram, adding 35 milliliters of acetone to the vial, capping tightly and then shaking overnight. The vial was then centrifuged for 30 minutes at 3000 rpm at room temperature, the solution was decanted from the gel which was dried for 2 hours in a vacuum at 100°C. The vials containing the dried gel were then reweighed to the nearest 0.001 gram and the percentage of total gel was then determined by dividing the weight of the gel by the weight of the original styrenic copolymer composition and then multiplying by 100. The weight percent of the polyorganosiloxane in the styrenic copolymer was determined by conventional silicon analysis of the styrenic copolymer composition and because the percentage of silicon in the polyorganosiloxane was known, the amount of polyorganosiloxane in the styrenic copolymer composition was readily calculated. The polyorganosiloxane gel ratio was determined by dividing the weight percent of total gel by the weight percent of polyorganosiloxane in the styrenic copolymer composition.

TABLE VII

| SCC | % Siloxane in SCC | Weight Percent Total Gel | Polyorganosiloxane Gel Ratio | Impact Strength |
| --- | --- | --- | --- | --- |
| Example 5, Polyorganosiloxane A. | 14.4 | 8.3 | 0.58 | 0.3 |
| Example 7** | 9.9 | 6.8 | 0.69 | 1.5 |
| Example 3, A. | 7.7 | 6.4 | 0.83 | 2.0 |
| Example 4, Polyorganosiloxane C. | 19.4 | 18.3 | 0.94 | 4.1 |
| Example 3, D. | 49.4 | 58.6 | 1.19 | 2.1 |
| Example 4, Polyorganosiloxane F. | 17.5 | 30.8 | 1.76 | 5.8 |

**The styrenic copolymer composition identified as Example 7 was prepared as described in Example 1 where the mixture was 20 weight percent of the styrenic copolymer composition of Example 3, D. and 80 percent of a commercial styrene-acrylonitrile copolymer.

TABLE VI

| Styrenic Composition | Impact Strength |
| --- | --- |
| A. | 2.0 |
| B. | 2.2 |
| C. | 0.5 |
| D. | 2.7 |

EXAMPLE 8

The styrenic copolymer composition of Example 4, polyorganosiloxane F. and a commercial ABS were made into test samples and placed in a commercial weatherometer for various time periods and after each time period the notched Izod impact strengths were measured. The results were as shown in Table VIII. The commercial ABS was tested for comparative purposes.

TABLE VIII

| | Commercial ABS | | Styrenic Copolymer Composition | |
| --- | --- | --- | --- | --- |
| Hours in Weatherometer | Impact Strength | % Change | Impact Strength | % Change |
| 0 | 6.9 | — | 5.8 | — |
| 120 | 3.4 | −50.7 | 4.5 | −22.4 |
| 344 | 2.8 | −59.4 | 4.0 | −31.0 |
| 518 | 2.4 | −65.2 | 3.9 | −32.8 |

The above two materials were tested for lubricity using a modified crockmeter reciprocating ball bearing tester. The results were as shown in Table IX.

TABLE IX

| Number of Cycles | Commercial ABS, Width of Groove worn, mm. | Styrenic Copolymer Composition, Width of Groove worn, mm. |
|---|---|---|
| 500 | 0.7 | 0.3 |
| 1000 | 1.0 | 0.5 |

EXAMPLE 9

Emulsified polyorganosiloxanes were prepared as described in Example 2,(E) except 36 grams of dodecylbenzenesulfonic acid instead of 60 grams, and the organosilicon ingredients were as follows:

A.  1073 grams of mixed polydimethylsiloxane cyclics
    306 grams of vinyltriethoxysilane
B.  1111 grams of mixed polydimethylsiloxane cyclics
    69.4 grams of mixed polymethylvinylsiloxane cyclics
    67.3 grams of tetraethoxysilane
C.  1076 grams of mixed polydimethylsiloxane cyclics
    69.5 grams of mixed polymethylvinylsiloxane cyclics
    143.7 grams of methyltriethoxysilane Styrenic copolymer compositions were made using each of the above emulsified polyorganosiloxanes by the procedure described for the emulsified polyorganosiloxane B of Example 4. The impact strength, tensile strength at yield and break and percent elongation at yield and break were determined and were as shown in Table X.

trile and methacrylonitrile and 0 to 70 weight percent methylmethacrylate, there being at least one styrene monomer and at least one monomer from the nitrile group or methylmethacrylate or at least one styrene monomer, methylmethacrylate and at least one monomer from the nitrile group, said emulsified polyorganosiloxane having units of the formulae $R_2SiO$, $RSiO_{1.5}$, $R_3SiO_{0.5}$ and $SiO_2$ wherein there is for each 100 moles of $R_2SiO$ units, from 0 to 12 moles of $RSiO_{1.5}$ units, from 0 to 1.5 moles of $R_3SiO_{0.5}$ units and from 0 to 5 moles of $SiO_2$ units, where R is a monovalent radical selected from the group consisting of methyl, phenyl vinyl and allyl where at least 60 percent of the R groups of the polyorganosiloxane are methyl and from 0.5 to 8 percent of the R groups are vinyl or allyl, said polyorganosiloxane having a weight average molecular weight of at least 10,000 and the polyorganosiloxane molecule being endblocked with groups selected from $R_3SiO_{0.5}$ units, hydroxyl groups or both, the emulsified polyorganosiloxane having an average particle size of from 1000 to 10,000 Angstroms where at least 50 percent of the particles fall within said range of particle size, and the amount of polyorganosiloxane being from 5 to 70 weight percent based on the combined weight of the monomeric composition and the polyorganosiloxane where the monomeric composition and the polyorganosiloxane are 100 weight percent.

2. The method in accordance with claim 1 in which the emulsifier system also contains a buffer and a chain transfer agent.

TABLE X

| | Emulsified Polyorganosiloxane | | | styrenic copolymer composition | | | |
|---|---|---|---|---|---|---|---|
| | | | | | Tensile Strength, p.s.i. | Elongation, % | |
| | % Vinyl radicals | Moles $RSiO_{1.5}$ 100 moles $R_2SiO$ | Moles $SiO_2$ 100 moles $R_2SiO$ | Impact Strength | at yield | at break | at yield | at break |
| A. | 5.3 | 11.1 | — | 3.0 | 7030 | 6330 | 4.9 | 7.6 |
| B. | 2.6 | — | 2.0 | 3.9 | 6800 | 5700 | 4.7 | 7.1 |
| C. | 2.6 | 5.3 | — | 4.9 | 6860 | 5820 | 4.6 | 6.3 |

That which is claimed is:

1. A method for the emulsion polymerization of styrenic copolymers comprising adding a monomeric composition to an aqueous emulsifier system at a suitable temperature for polymerization of the monomeric composition, said emulsifier system consisting essentially of a redox polymerization catalyst for the monomeric composition and an emulsified polyorganosiloxane, continuing the polymerization until substantially all the monomeric composition is polymerized to a styrenic copolymer composition, coagulating the styrenic copolymer composition, separating the styrenic copolymer composition from the aqueous medium and recovering the styrenic copolymer composition, said monomeric composition consisting essentially of 10 to 95 weight percent of a styrene selected from styrene, alpha-methylstyrene and ring substituted chlorinated styrene, 0 to 60 weight percent of a nitrile selected from the group consisting of acryloni- 3. The method in accordance with claim 1 in which the emulsified polyorganosiloxane has an average particle size of from 1000 to 4000 Angstroms.

4. The method in accordance with claim 2 in which the emulsified polyorganosiloxane has an average particle size of from 1000 to 4000 Angstroms.

5. The method in accordance with claim 1 in which the polyorganosiloxane is present in an amount of from 5 to 30 weight percent and the recovered styrenic copolymer composition has a room temperature notched Izod impact strength of greater than 1.0 foot pounds per inch of notch wherein the notch is 45° and 0.1 inch deep for a compression molded sample.

6. The method in accordance with claim 3 in which the polyorganosiloxane is present in an amount of from 5 to 30 weight percent and the recovered styrenic copolymer composition has a room temperature notched Izod impact strength of greater than 1.0 foot pounds per inch of notch wherein the notch is 45° and 0.1 inch deep for a compression molded sample.

7. The method in accordance with claim 1 in which the redox polymerization catalyst consists essentially of a peroxide, a catalyst promoter and a reducing agent.

8. The method in accordance with claim 7 in which the peroxide is cumene hydroperoxide, the reducing agent is dextrose and the catalyst promoter is ferrous sulfate heptahydrate.

9. The method in accordance with claim 2 in which the redox polymerization catalyst consists essentially of cumene hydroperoxide, dextrose and ferrous sulfate heptahydrate, the buffer is sodium pyrophosphate decahydrate and the chain transfer agent is n-dodecylmercaptan.

10. The method in accordance with claim 5 in which the polyorganosiloxane has a weight average molecular weight greater than 250,000, has for each 100 moles of $R_2SiO$ units, from 0.5 to 2 moles of $SiO_2$ units, and from 2 to 8 percent of the R groups are vinyl and from 92 to 98 percent of the R groups are methyl.

11. The method in accordance with claim 5 in which the polyorganosiloxane has a weight average molecular weight greater than 250,000, has for each 100 moles of $R_2SiO$ units, from 0.75 to 3 moles of $RSiO_{1.5}$ units and from 2 to 8 percent of the R groups are vinyl and from 92 to 98 percent of the R groups are methyl.

12. The method in accordance with claim 10 in which the polyorganosiloxane is present in an amount of from 15 to 25 weight percent and the monomeric composition consists essentially of from 65 to 75 weight percent styrene and from 25 to 35 weight percent acrylonitrile.

13. The method in accordance with claim 1 in which the polyorganosiloxane is present in an amount of from 30 to 70 weight percent.

14. The method in accordance with claim 13 in which the recovered styrenic copolymer composition is mechanically blended with a copolymer consisting of styrene and acrylonitrile.

15. A styrenic copolymer composition consisting essentially of a continuous styrenic copolymer matrix having copolymer units derived from at least one styrene monomer selected from the group consisting of styrene, alphamethylstyrene and ring substituted chlorinated styrene and at least one monomer derived from a nitrile monomer selected from the group consisting of acrylonitrile and methacrylonitrile or methylmethacrylate or from at least one of the styrene monomers, methylmethacrylate and at least one of the nitrile monomers, having dispersed therein gelled particles which are essentially free of inclusions of free styrenic copolymer, which have an average particle size of from 1000 to 10,000 Angstroms where at least 50 percent of the particles fall within said range of particle size, said gelled particles consisting essentially of polyorganosiloxane and styrenic copolymer grafted to polyorganosiloxane wherein said styrenic copolymer grafted to the polyorganosiloxane is derived from the copolymer units defined above, said gelled particles being present in the styrenic copolymer composition in an amount sufficient enough to provide a polyorganosiloxane gel ratio of at least 0.65, said polyorganosiloxane having units of the formulae $R_2SiO$, $RSiO_{1.5}$, $R_3SiO_{0.5}$ and $SiO_2$ wherein there is for each 100 moles of $R_2SiO$ units, from 0 to 12 moles of $RSiO_{1.5}$ units, from 0 to 1.5 moles of $R_3SiO_{0.5}$ units and from 0 to 5 moles of $SiO_2$ units wherein R is a monovalent radical selected from the group consisting of methyl, phenyl, vinyl and allyl where at least 60 percent of the R groups of the polyorganosiloxane are methyl and from 0.5 to 8 percent of the R groups are vinyl or allyl wherein said styrenic copolymer grafted to the polyorganosiloxane is bonded to the polyorganosiloxane through R groups, said polyorganosiloxane in the ungrafted state having a weight average molecular weight of at least 10,000, the amount of polyorganosiloxane being from 5 to 70 weight percent based on the total weight of the styrenic copolymer composition, said copolymer units being present in amounts sufficient to provide from 30 to 95 weight percent based on the total weight of the styrenic copolymer composition in a ratio sufficient to provide from 10 to 95 weight percent of styrene units, from 0 to 60 weight percent of nitrile units and from 0 to 70 weight percent methylmethacrylate units, where the styrenic copolymer composition has a room temperature notched Izod impact strength of greater than 1.0 foot pounds per inch of notch wherein the notch is 45° and 0.1 inch deep for a compression molded sample.

16. The styrenic copolymer composition according to claim 15 in which the copolymer units are derived from styrene and acrylonitrile.

17. The styrenic copolymer composition according to claim 15 in which the copolymer units are derived from styrene and methylmethacrylate.

18. The styrenic copolymer composition according to claim 15 in which the polyorganosiloxane gel ratio is at least 0.70.

19. The styrenic copolymer composition according to claim 15 in which the polyorganosiloxane has an ungrafted weight average molecular weight greater than 250,000 and has for each 100 moles of $R_2SiO$ units, from 0.5 to 2 moles of $SiO_2$ units.

20. The styrenic copolymer composition according to claim 15 in which the polyorganosiloxane has an ungrafted weight average molecular weight greater than 250,000 and has for each 100 moles of $R_2SiO$ units, from 0.75 to 3 moles of $RSiO_{1.5}$ units.

21. The styrenic copolymer composition according to claim 15 in which the polyorganosiloxane is present in an amount of from 5 to 30 weight percent.

22. The styrenic copolymer composition according to claim 18 in which the gelled particles have a particle size of from 1000 to 4000 Angstroms.

23. The styrenic copolymer composition according the claim 18 in which the copolymer units are derived from styrene and acrylonitrile.

24. The styrenic copolymer composition according to claim 19 in which the copolymer units are derived from styrene and acrylonitrile.

25. The styrenic copolymer composition according to claim 24 in which the polyorganosiloxane is present in an amount of from 5 to 30 weight percent.

26. The styrenic copolymer composition according to claim 25 in which the polyorganosiloxane is present in an amount of from 15 to 25 weight percent and the copolymer units are present in amounts sufficient to provide from 75 to 85 weight percent based on the total weight of the styrenic copolymer composition in a ratio sufficient to provide from 65 to 75 weight percent of styrene units and from 25 to 35 weight percent acrylonitrile units.

* * * * *